2 Sheets—Sheet 1.

T. B. TATTERSLEY.
Egg Stand and Holder.

No. 222,961. Patented Dec. 23, 1879.

Witnesses
Fred G. Dieterich
Jos. T. Power

Inventor
Thomas B. Tattersley
by Louis Bagger & Co.
Attorneys

N. PETERS, PHOTO-LITHOGRAPHER, WASHINGTON, D. C.

2 Sheets—Sheet 2.
T. B. TATTERSLEY.
Egg Stand and Holder.
No. 222,961. Patented Dec. 23, 1879.
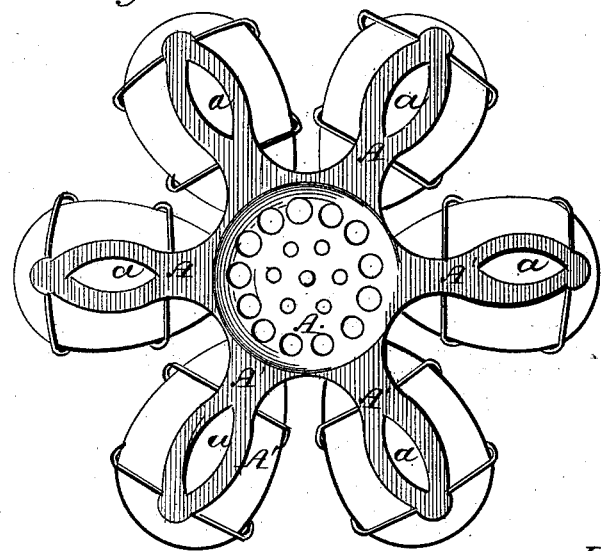
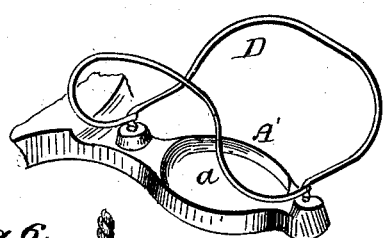
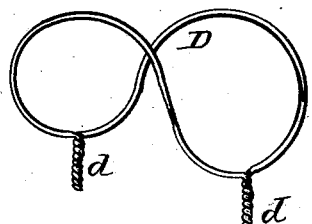
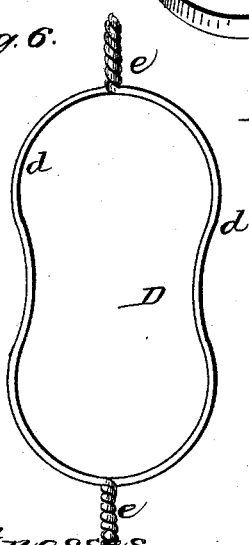
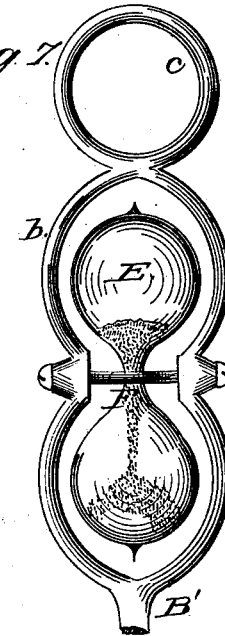
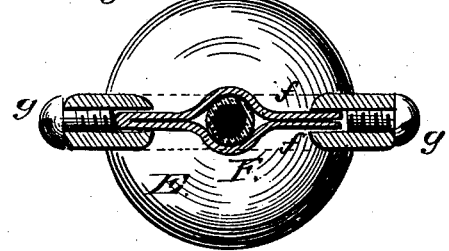
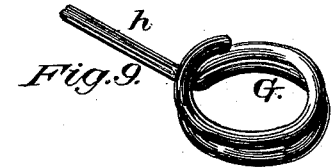
Witnesses
Fred. G. Dietrich
Jos. F. Power
Inventor
Thos. B. Tattersley
by Louis Bagger & Co.
Attorneys
N. PETERS, PHOTO-LITHOGRAPHER, WASHINGTON, D. C.

UNITED STATES PATENT OFFICE.

THOMAS B. TATTERSLEY, OF WEST MERIDEN, CONNECTICUT.

IMPROVEMENT IN EGG STANDS AND HOLDERS.

Specification forming part of Letters Patent No. 222,961, dated December 23, 1879; application filed November 8, 1879.

*To all whom it may concern:*

Be it known that I, THOMAS B. TATTERSLEY, of West Meriden, in the county of New Haven and State of Connecticut, have invented certain new and useful Improvements in Egg Stands or Holders; and I do hereby declare that the following is a full, clear, and exact description of the invention, which will enable others skilled in the art to which it appertains to make and use the same, reference being had to the accompanying drawings, which form a part of this specification, and in which—

Figure 1:
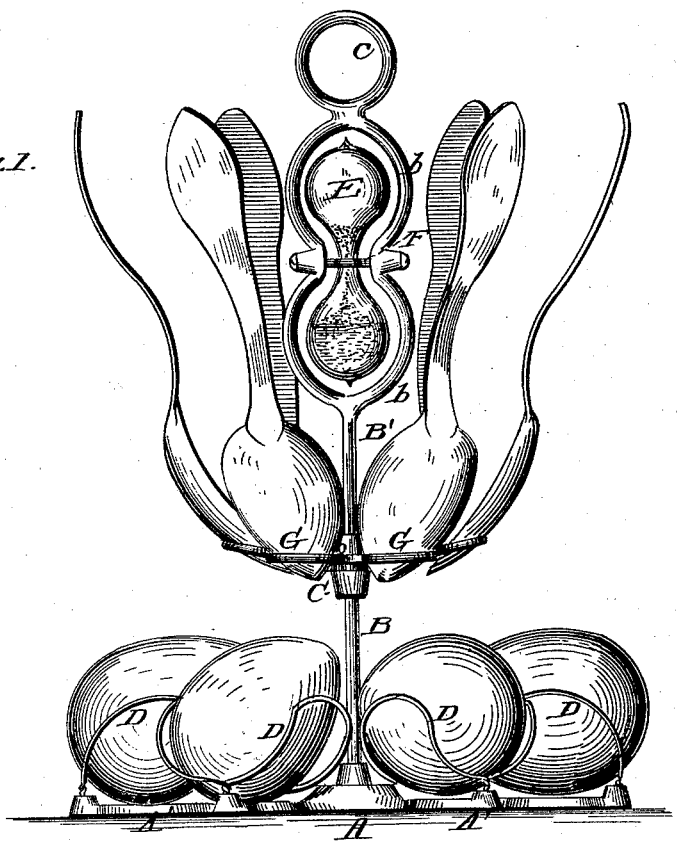
Figure 2:
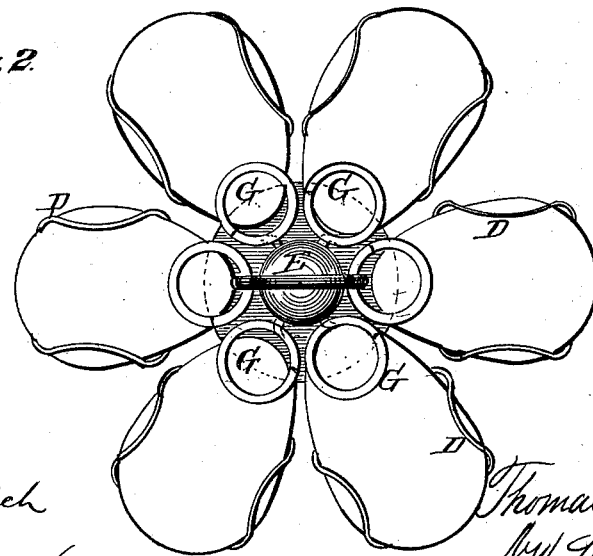

Figure 1 is a side elevation, showing the spoons inserted into their holders and the device ready for placing on the table. Fig. 2 is a top view, the spoons having been removed. Fig. 3 is a bottom view. Fig. 4 is a perspective view of one of my improved egg clasps or holders with that portion of the base to which it is attached. Fig. 5 is a similar view of the holder detached from its base. Fig. 6 shows the holder flat and before being bent into shape to form the spring-clasp shown in Figs. 4 and 5. Fig. 7 is a side view of the upper part of the handle, showing the arrangement of the reversible time-glass. Fig. 8 is a section, showing the construction of the swivel ring or joint in which the glass is suspended; and Fig. 9 is a perspective view of one of my improved spoon-holders detached from the stand.

Similar letters of reference indicate corresponding parts in all the figures.

My invention relates to devices or stands for holding and serving eggs, the raw eggs being placed in holders arranged upon the base of the stand, which is then immersed in boiling water and allowed to remain there until the eggs have been boiled, when it is withdrawn and placed upon the table, (the hot water evaporating rapidly,) ready for serving.

My improvement consists in constructing a device of this class with wire spring-clasps, in which the eggs, during the process of boiling and serving, lie upon their sides, instead of standing upon their ends, as usual, thus requiring a much less depth or quantity of water to cover and boil them, and presenting a neater and more attractive appearance when served up in the stand.

It further consists in the combination, with the stand, of a time or sand glass, which will indicate the exact time the stand, with the eggs placed therein, is to remain in the boiling water; and, finally, it consists in the combination, with the stand, of spoon-holders of an improved construction, all as hereinafter more fully described, and particularly pointed out in the claims.

In the two sheets of drawings hereto annexed, A represents the base of my improved egg stand or holder, from which radiate six (or more or less) arms, A', each of which is of oval shape, and has an oval opening, $a$, in the center. The handle or standard consists of two parts, the lower part or section, B, being screwed into the center of the base-piece A, and at its upper end into a socketed disk or center-piece, C, which serves as a joint or coupling between the upper and lower handle-sections, B' B.

D D are the egg clasps or holders, each of which is made from two pieces of wire, $d$ $d$, (see Figs. 5 and 6,) of equal length, which are curved and twisted together at opposite ends, as shown at $e$ $e$. To form the clasp, the ends $e$ $e$ are bent down and carried toward each other, the sides $d$ $d$ being at the same time turned up and toward each other, so as to form, as it were, two arched clasps or bails, united at their ends by the twisted staples $e$ $e$, between which said clasps the egg is placed sidewise, resting at each end upon the staples $e$ $e$, which are inserted into opposite ends of the arms A', as shown in the drawings.

The egg, after it has been placed in the clasp, does not touch any portion of the base-piece, but is suspended within its clasp just above the opening $a$, which admits free access to all parts of the egg of the boiling water. The upper arched parts of the clasp, pressing against the sides of the egg, hold this firmly in place, so that it cannot possibly slip out of itself, but yet may be readily inserted into the clasp or removed therefrom with the fingers.

The upper section, B', of the standard or handle is bifurcated, as shown more clearly at $b$ $b$, Fig. 7, to form a loop or opening, within which the reversible sand-glass E is pivoted. The glass is inserted, by its narrow waist or middle, into a swivel-ring of the construction shown in Fig. 8, the ends or shanks $f$ $f$ of the ring F being inserted into apertures in the side pieces, b b, and adjusted by means of screws g g, so that the glass will hang exactly in the middle of the opening in the handle provided for it. By tightening the screws g g against the ends of the shanks f f the friction may be regulated so that the glass can easily be reversed by hand to set it going, yet it cannot become accidentally reversed or reverse its position of its own account. The upper section, B', terminates in a ring, c, for conveniently handling the device.

The spoon-holders—which constitute the third part of my improvement—consist each of a piece of wire, one end of which is bent into a coil, G, and the other end is turned up at an angle to the plane of the coil, as shown more clearly in Fig. 9 on Sheet 2 of the drawings, so as to form a short shank, h, which forms a means of attachment for the holder upon the button or center-piece C, the periphery of which is drilled with a series of holes for the insertion of the shanks h. The spoons are inserted into the holders by inserting the point or tip of the bowl between the two windings of the coil, as shown in Fig. 1; or, if preferred, the handle end may be inserted into and clamped between the windings of the coil. The arrangement shown in the drawings presents, however, the neatest, most convenient, and most ornamental appearance.

Having thus described my invention, I claim and desire to secure by Letters Patent of the United States—

1. In an egg stand or holder, the wire spring-clasps D, consisting of the wire sections d d, bent to form arched spring-bails, united at their ends by being twisted to form staples e e, substantially as and for the purpose herein shown and set forth.

2. In an egg stand or holder, the base-piece A, provided with radial arms A', having oval openings a, and provided with the wire spring clasps or holders D, adapted to hold the egg in a flat or lying position by clamping its sides, substantially as and for the purpose herein shown and described.

3. An egg stand or holder the standard B B' of which is provided with a sand-glass, E, substantially as and for the purpose herein shown and set forth.

4. The combination of the bifurcated standard B' b b, swivel-ring F, having shanks f f, set-screws g g, and reversible sand-glass E, substantially as and for the purpose herein shown and specified.

5. A spoon-holder consisting of a wire coil, G, provided with a shank, h, for its attachment to any suitable stand or support, substantially as and for the purpose herein shown and described.

6. In an egg stand or holder, a vertical standard or handle provided with a series of circumferentially-arranged spoon-holders, composed each of a wire coil, G, provided with a shank, h, by which it is attached to the standard, substantially as and for the purpose herein shown and specified.

7. As a whole, and as an article of manufacture, the herein-described egg stand or holder, composed of the base A, having radiating arms A', spring-clasps D, standard B B', provided with the sand-glass E, center-disk C, and spoon-holders consisting of the wire coils G, provided with shanks h for their attachment to the periphery of disk C, all constructed, combined, and arranged substantially in the manner and for the purpose herein shown and set forth.

In testimony that I claim the foregoing as my own I have hereunto affixed my signature in presence of two witnesses.

THOMAS B. TATTERSLEY.

Witnesses:
GEORGE DESSUREAU,
F. L. REILLY.